United States Patent [19]

Seo

[11] Patent Number: 5,010,566
[45] Date of Patent: Apr. 23, 1991

[54] CORDLESS TELEPHONE

[75] Inventor: Masayoshi Seo, Higashi-Hiroshima, Japan

[73] Assignee: Sharp Kabushiki Kaisha, Osaka, Japan

[21] Appl. No.: 403,887

[22] Filed: Sep. 7, 1989

[30] Foreign Application Priority Data

Sep. 8, 1988 [JP] Japan ................................ 63-225347

[51] Int. Cl.$^5$ .......................................... H04M 11/00
[52] U.S. Cl. ........................................ 379/61; 379/63
[58] Field of Search ....................... 379/59, 61, 62, 63, 379/354, 396, 376, 61-63, 396; 362/24; 340/789; 341/34

[56] References Cited

U.S. PATENT DOCUMENTS

| | | | |
|---|---|---|---|
| 3,962,553 | 6/1976 | Linder et al. | 379/61 |
| 4,332,981 | 6/1982 | Palombi et al. | 379/62 |
| 4,894,856 | 1/1990 | Nakanishi et al. | 379/61 |

FOREIGN PATENT DOCUMENTS

| | | | |
|---|---|---|---|
| 0153342 | 9/1984 | Japan | 379/61 |
| 0229432 | 11/1985 | Japan | 379/61 |

OTHER PUBLICATIONS

Publication of Autophon's Portatel-Cordless Telephone Technical Data Sheet.

Publication-Universal Tote & Talk 3400 User's Manual.

Primary Examiner—Jin F. Ng
Assistant Examiner—Dwayne D. Bost

[57] ABSTRACT

A cordless telepone includes a base unit connected to a telephone line so as to communicate by radio waves for talking and a hanset. The handset includes a speaker, a microphone, and a transmitting and receiving circuit for communicating with the base unit by radio waves, transforming the signals from the caller into acoustic sound by the speaker, and sending the output from the microphone to the caller. The handset further includes a battery for providing the transmitting and receiving circuit with electric power. Still further, the handset includes a device for display to indicate the in-service state, a device for detecting the contact of the speaker area with a part of the body, a device for detecting talking to detect the in-service state, and a device for controlling to stop the display action of the display device when the speaker area is in contact with a part of the body and is in service this stopping of the display device occurs response to the output from the contact detecting device and the talk detecting device. The control device further affects the display action by the display device while the speaker area is not in contact with the body during service. The handset, in this device, is electrically powered by a battery.

18 Claims, 4 Drawing Sheets

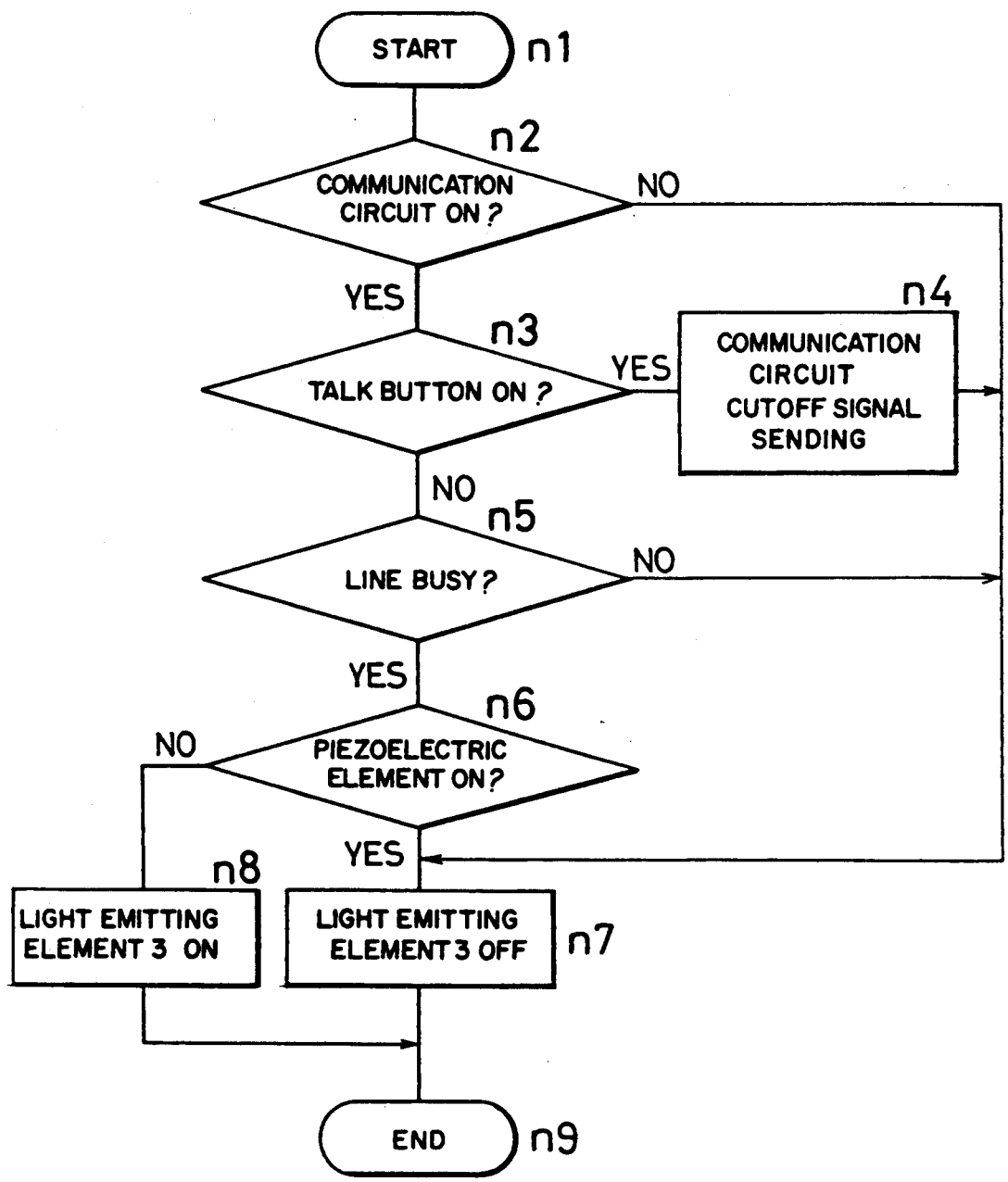

CORDLESS TELEPHONE

BACKGROUND OF THE INVENTION

1. Field of the Invention

The present invention relates to a cordless telephone having a base unit connected to a communication line such as telephone line, and a handset connected to the base unit by radio communication and furnished with a device for display so as to indicate that the handset is in service.

2. Description of the Prior Art

In the conventional telephone, the service can be directly recognized by lifting the handset off the cradle, and the end of a call can be confirmed directly by putting the handset back on the cradle. In a cordless telephone which is recently spreading in popularity, however, the handset is often placed at a distance from the base unit. In this case, therefore, the end of a call cannot be confirmed by the handset in the conventional method, and in the hitherto cordless telephone, a pilot lamp is built in the handset as the device for display. This lamp is lit while the handset is in service. Further, by pressing the disconnect or hang up button on the handset after the call is complete, the pilot lamp goes out.

In such a conventional cordless telephone, the pilot lamp is usually located near the call button (input key), and it is not at all visible by the user if the speaker area of the handset is fitted to the ear. Accordingly, it is quite meaningless to always light up the pilot lamp always during call by the handset. This only achieved to the battery is spent purposelessly.

SUMMARY OF THE INVENTION

It is hence a primary object of the invention to present a novel cordless telephone capable of, by solving the above mentioned technical problems, stopping the display action by the display device while the handset is in service so as to minimize the wasteful consumption of the electric power supplied from the battery or the like.

To achieve the above object, the cordless telephone of the invention comprises:

(a) a base unit connected to a telephone line so as to communicate by radio waves for talking, and (b) a handset comprising:

(b1) a speaker, (b2) a microphone, (b3) a transmitting and receiving circuit for communicating with the base unit by radio waves, transforming the signals from the caller into acoustic sound in the speaker, and sending the output from the microphone to the caller, and (b4) a battery for providing the transmitting and receiving circuit with electric power, wherein (c) the handset further comprises:

(c1) a device for display to indicate the in-service state, (c2) a device for detecting the contact of the speaker area with a part of the body, (c3) a device for detecting the talk to detect the in-service state, and (c4) a device for controlling to stop the display action of the display a device when the speaker area is in contact with a part of the body and is in service, in response to the output from the contact detecting device and talk detecting device, and to effect the display action by the display device while the speaker area is not in contact with the body during service, and (c5) the handset is electrically powered by the battery.

Preferably, the display device is a light emitting diode.

Also preferably, the contact detecting device is a piezoelectric element.

Further preferably, the handset is provided with device for dial input, and the controlling device generates a dial signal in response to the output of this dial input device so as to call the partner by the base unit.

More preferably, the contact detecting device has a penetration hole, and the speaker is disposed behind this contact detecting device.

The invention also relates to a cordless telephone having a base unit connected to a telephone line and a handset connected to the base unit through radio communication and equipped with a device for display so as to indicate the in-service state by the handset by the display device, which includes:

a device for detecting contact when a part of the body of the user contacts an area proximate to the speaker, and a device for stopping the display to stop the display action by the display device when a part of the body of the user is in contact with the area proximate to the speaker of the handset, in response to the detection signal from the contact detecting device.

According to invention, when the contact of a part of the body of the user with an area proximate to the speaker of the handset is detected by the contact detecting device, the display action of the display device is stopped by the display stopping device while a part of the body of the user is in contact with the area proximate to the speaker of the handset. When the part of the body of the user is departed from the area proximate to the speaker of the handset, the display action of the display device is affected again.

Thus, according to the cordless telephone of the invention, while talking, as long as a part of the body of the user remains in contact with the area proximate to the handset, the display action by the display device is not affected to display the in-service state, so that the consumption of the battery while the handset is in service can be minimized.

BRIEF DESCRIPTION OF THE DRAWINGS

These and other objects of the invention, as well as the features and advantages thereof, will be better understood and appreciated, from the following detailed description taken in conjunction with the drawings.

FIG. 4 is a flow chart for explaining the operation of a handset 1.

DETAILED DESCRIPTION OF THE PREFERRED EMBODIMENT

Figure 1:
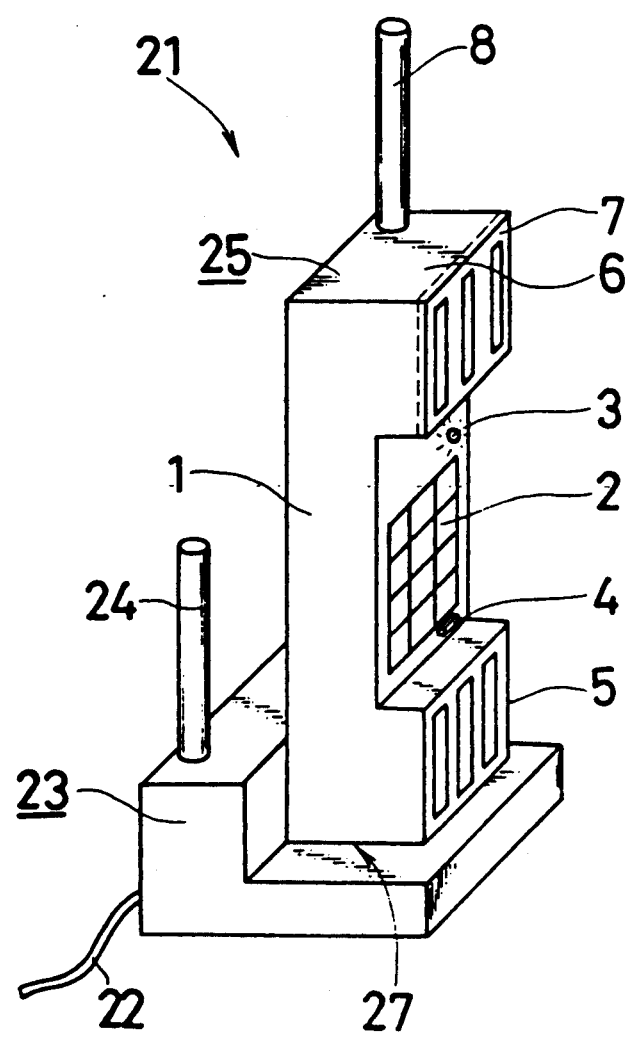
FIG. 1 is a perspective view showing the entire structure of a cordless telephone in one of the embodiments of the invention.

Referring now to the drawings, one of the preferred embodiments of the invention is described in details below.

FIG. 1 is a perspective view showing the entire structure of a cordless telephone 21 according to an embodiment of the invention. The cordless telephone 21 is connected to a telephone line 22, and include a handset 25 and a base unit 23 for radio communication therewith, the base unit 23 having an antenna 24 for radio communication with the handset 25. The handset 25 includes key switches 2 such as numeric keys as a dial input device provided inside the grip of a handset unit 1; a light emitting element 3 as a display device composed of a light emitting diode (LED) or the like disposed in the vicinity of the key switches 2 inside the grip; a disconnect or hang-up button 4 as the talk completion device for changing over between line capturing state and talk waiting state; a transmitter 5 with a microphone 14 built in and located near the mouth of the user; a receiver 6 containing a piezoelectric element 7 known as touch sensor or the like as the contact detecting device when contacting with the ear, that is, a part of the body of the user contacted while talking; an antenna 8 for communicating with the base unit 23; and a battery 28.

Figure 2:
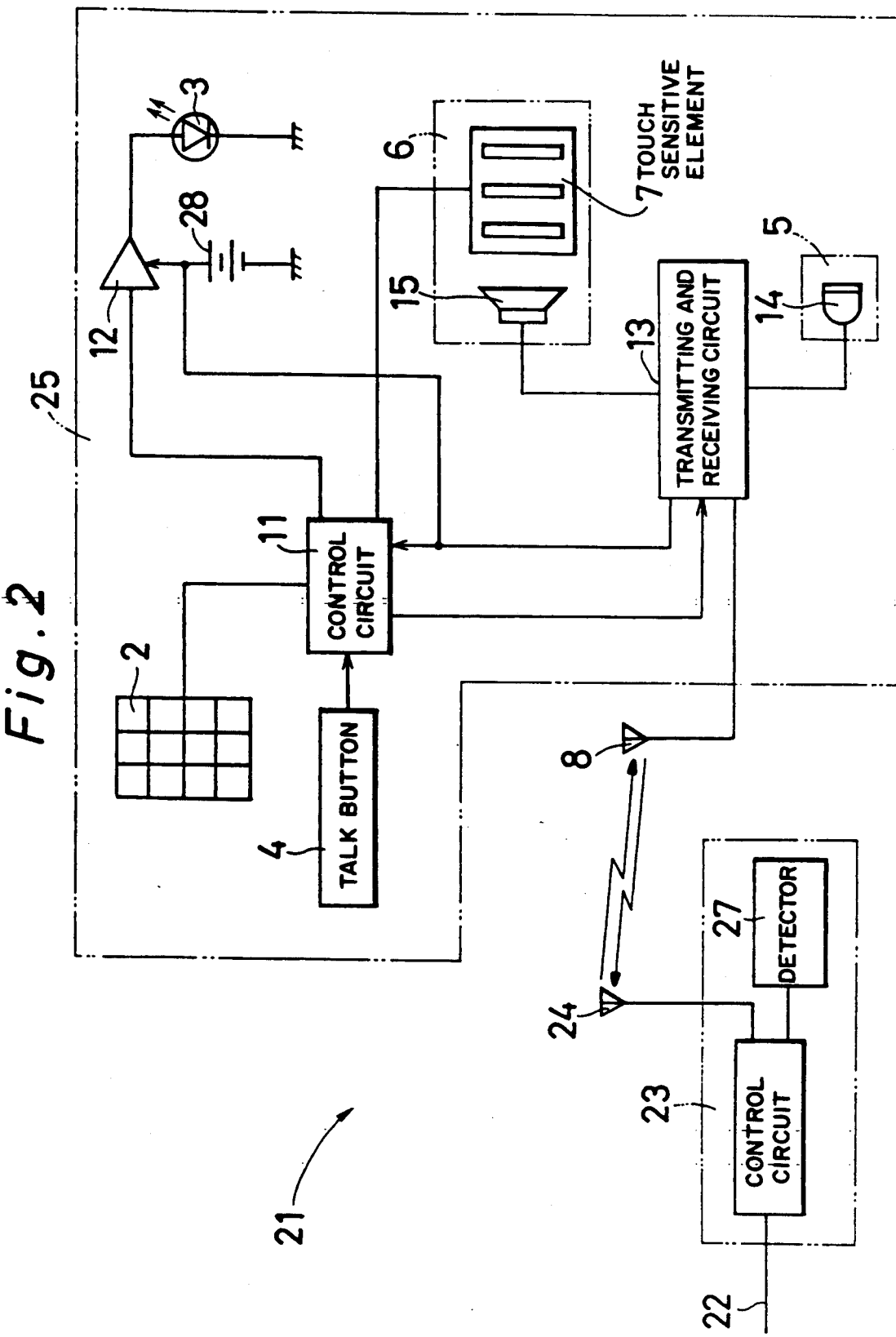
FIG. 2 is a block diagram showing a schematic electrical structure of the cordless telephone in FIG. 1.

FIG. 2 is a block diagram showing a schematic electrical construction of the cordless telephone 21.

In this diagram, a key signal by the operation of the key switch 2 is given to a control circuit 11 which is a device for controlling the members in the handset 25. It is also sent out from the antenna 8 through a transmitting and receiving circuit 13, and is received through the antenna 24 of the base unit 23. It is then sent out to the telephone at the destination through the telephone line 22. Further, by the key signal from the key switch 2, the control circuit 11 sends out a drive signal to a driver 12 for lighting up the light emitting element 3. Thus, the driver 12 is driven to light up the light emitting element 3. In the meantime, a signal from the piezoelectric element 7 is applied to the control circuit 11, and a stop signal is sent out to the driver 12 from this piezoelectric element 7. Thus, driving of the driver 12 is stopped to extinguish the light emitting element 3. At the same time, the control circuit 11 sends out a control signal to the transmitting and receiving circuit 13. The transmitting and receiving circuit 13 amplifies and modulates the transmission signal received from a microphone 14 built in the transmitter 5. It then sends out a signal from the antenna 8, and demodulates and amplifies the reception signal sent from the base unit 23 through the telephone line 22 which is a communication circuit. Finally, it sends out a signal to a speaker 15 built in the receiver 6. Thus, an acoustic signal is delivered from the speaker 15. Such a handset 25 is electrically powered by a built-in battery 28.

Figure 3:
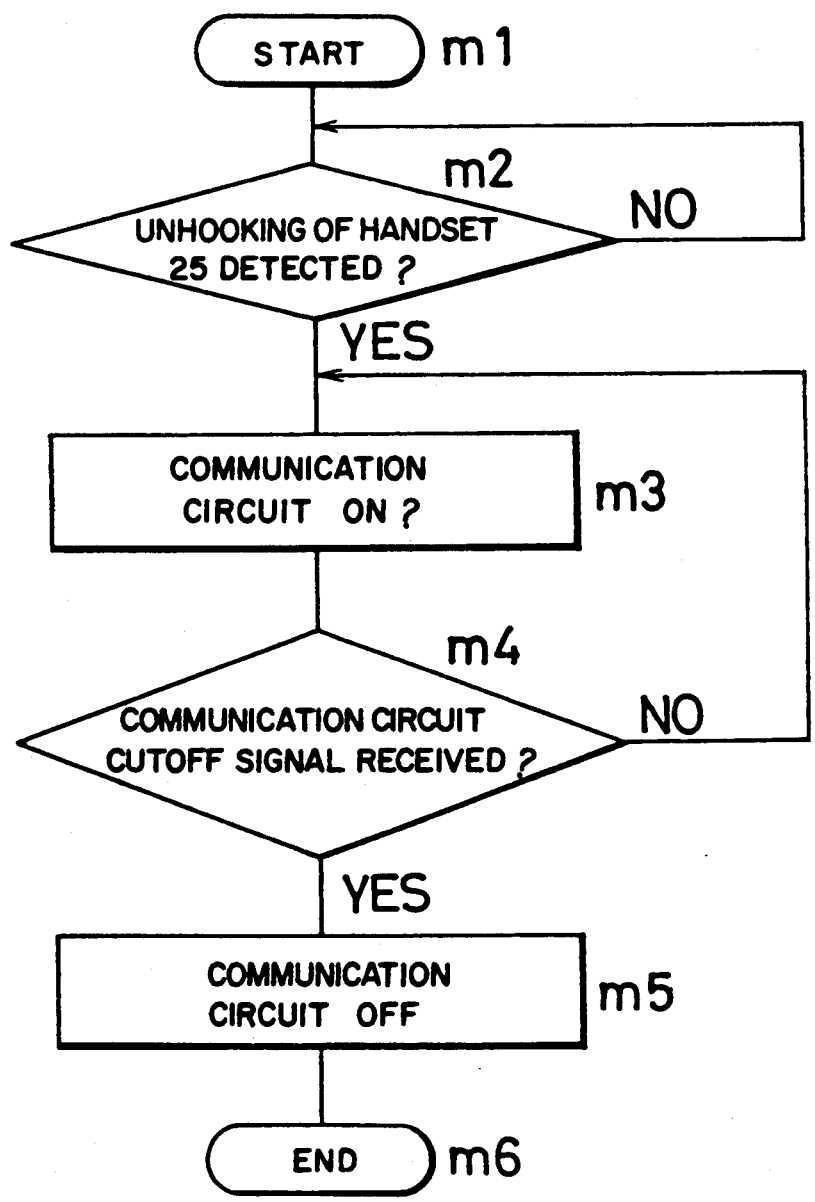
FIG. 3 is a flow chart for explaining the operation of a base unit 23.

Referring now to FIG. 3 and FIG. 4, the talking action of the base unit 23 and handset 25 will be described below. First, at step m1 in FIG. 3, the talking action is started. The handset 25 is unhooked from the base unit 23 by the caller at step m2. Unhooking is detected by the handset unhook detecting switch 27.

At step n1 in FIG. 4, when the key switch 2 is operated and the telephone circuit 22 is connected at step n2, a drive signal is issued from the control circuit 11 to the driver 12. Further, when the talk button 4 is not pressed at step n3, the operation goes to step n5. Then when the line is busy, the operation advances to step n6. When the receiver 6 is not in contact with the user's ear, the light emitting element 3 lights up at step n8. In this state, when the user touches the receiver 6 of the handset by the ear, it is detected by the piezoelectric element 7, and the detection signal is sent out to the control circuit 11. The control circuit 11, on the basis of this detection signal, sends out a stop signal to the driver 12. Thus, driving of the driver 12 is stopped, and the light emitting element 3 is extinguished at step n7. Afterwards, when the user's ear is departed again from the piezoelectric element 7, the control circuit 11 then sends out a drive signal to the driver 12 to drive the driver 12. This thereby lights the light emitting element 3 again. Afterwards, by pressing the hang-up button 4 at step n3, a communication circuit cut-off signal is sent out from the handset 25 to the base unit 23 at step n4. Thus the base unit 23 receives the communication circuit signal at step m4 in FIG. 3. Then the connection with the telephone line 22 is cut off at step m5, so that the light emitting element 3 of the handset 25 goes out.

In this way, while the handset 25 is in service, the light emitting element 3 is being extinguished, and the consumption of the battery 28 can be considerably reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A cordless telephone apparatus including a base unit connected to a telephone line for communication, and a handset, operatively connected to the base unit by radio waves, including a speaker, a microphone, a transmitting and receiving circuit for communicating with the base unit by radio waves, transforming the signals from a caller into acoustic sound by the speaker, and second the output from the microphone to the caller, and a battery for providing the transmitting and receiving circuit with electric power, the handset further comprising:

display means for indicating an in-service state of the cordless telephone activated for communication;
   contact detecting means for detecting contact of a user with an area proximate to the speaker;
   activation detecting means for detecting activation of the cordless telephone for communications to detect the in-service state; and
   control means operatively connected to the display means, the contact detecting means and the activation detecting means, for controlling the display means to stop indicating an in-service state when an area proximate to the speaker is detected to be in contact with a user and an in service state is detected, in response to the contact detecting means and activation detecting means, and for controlling the display means to indicate an in-service state when an area proximate to the speaker is not detected to be in contact with a user and an in service state is detected; and
   the handset battery means for electrically powering the handset.

2. The cordless telephone apparatus of claim 1, wherein the display means is a light emitting diode.

3. The cordless telephone apparatus of claim 1, wherein the contact detecting means is a piezoelectric element.

4. The cordless telephone apparatus of claim 1, wherein the handset further comprises dial means for dial input, and the control means generates a dial signal in response to activation of the dial input means to initiate or call via the base unit.

5. The cordless telephone apparatus of claim 1, wherein the contact detecting means includes a penetration hole in an area proximate to the speaker, the speaker being disposed behind the contact detecting means.

6. A cordless telephone apparatus including a base unit connected to a telephone line and a handset operatively connected to the base unit via radio communication and equipped with a display device for indicating an in-service state of the handset, the handset comprising:
contact detecting means for detecting contact when a part of the body of the user contacts with an area proximate to a speaker of the handset, and
stopping means for stopping the display device from indicating the in-service state when a part of the body of the user is detected to be in contact with an area proximate to the speaker of the handset, in response to the contact detecting means.

7. A handset of a cordless telephone including a base unit and the handset including a speaker and a transmitter for communicating, by radio communications, with the base unit, the handset further comprising:
display means for displaying indication of the cordless telephone being in-service;
detecting means for emitting a signal upon detecting contact of a user to an area of the handset in close proximity to the speaker; and
control means, operatively connected to said display means and said detecting means, for controlling said display means to display indication of the cordless telephone being in-service upon not receiving an output signal from said detecting means when the cordless telephone is in service and for controlling said display means to stop displaying indication of the cordless telephone being in-service upon receiving an output signal from the detecting means when the cordless telephone is in service.

8. The handset of claim 7 further comprising:
in-service detection means, operatively connected to said control means, for outputting a signal to said control means, upon detecting that the cordless telephone is in-service.

9. The handset of claim 7, wherein the detecting means is a piezoelectric element and the piezoelectric element is disposed in close proximity to the speaker.

10. The handset of claim 7, wherein the display means is a light emitting diode (LED).

11. The handset of claim 7, wherein the handset is of a "C" shaped configuration, the speaker of the handset being in one extended portion of the "C" and the transmitter being in the other extended portion of the "C" such that a user's ear and mouth can be simultaneously contacted to each of the respective extended portions of the "C" shaped configuration.

12. The handset of claim 11, wherein the detecting means is a piezoelectric element disposed in close proximity to the speaker.

13. The handset of claim 12, wherein the piezoelectric element detects contact of the user's ear to the handset, proximate to the speaker, and outputs a signal.

14. The handset of claim 7, further comprising:
end of service means, operatively connected to said control means, for outputting a signal to the control means to indicate that the cordless telephone is not in-service, and wherein said control means, upon receipt of said output signal from said end of service means, controls said display means to stop displaying indication of the cordless telephone being in service.

15. The handset of claim 7, further comprising:
battery means, operatively connected to said display means for providing power to enable said display means to display in-service indication.

16. A method of conserving power of a battery in a cordless telephone, including a handset with a battery, a speaker and a receiver and further including a base unit, which indicates to a user when the cordless telephone is in-service, comprising the steps of:
(a) displaying indication, on the handset, of the cordless telephone in-service;
(b) supplying power from the battery during said step (a) of displaying;
(c) detecting contact of a user to an area of the handset in close proximity to the speaker;
(d) inhibiting said step (a) of displaying by stopping said step (b) of supplying power upon detecting contact in step (c) to thus conserve battery power while said telephone is in-service.

17. The method of claim 16, further comprising the step of:
(e) terminating said step (a) of displaying upon said telephone not being in-service.

18. The method of claim 16, wherein said step (c) of detecting contact detects contact of a user's ear to an area of the handset in close proximity to the speaker.

* * * * *